United States Patent Office 3,732,191
Patented May 8, 1973

3,732,191
**POLYTHIOL VULCANIZATION OF EPIHALO-
HYDRIN ELASTOMERS**
Paul P. Nicholas, Broadview Heights, Ohio, assignor to
The B. F. Goodrich Company, New York, N.Y.
No Drawing. Filed Feb. 7, 1972, Ser. No. 224,317
Int. Cl. C08g 23/00
U.S. Cl. 260—79          16 Claims

ABSTRACT OF THE DISCLOSURE

Epihalohydrin elastomers are vulcanized by means of a 3-component vulcanization system comprising a polythiol, a tertiary amine, and a metal base compound. Polythiols such as 3,6-dithiaoctane-1,8-dithiol in combination with a tertiary amine such as 1,4-diaza(2.2.2)bicyclooctane, and sodium acrylate or litharge as a metal base compound vulcanize epihalohydrin elastomers such as the homopolymers of epichlorohydrin and elastomeric copolymers of epichlorohydrin and ethylene oxide forming vulcanizates of excellent physical and chemical properties. The curing system is quite flexible providing a wide variation in cure times at ordinary vulcanization temperatures.

CROSS REFERENCES TO RELATED APPLICATIONS

My copending application, Ser. No. 224,318 of even date herewith, discloses another vulcanization system for epihalohydrin elastomers based on a thioalkanoic acid or salt thereof, a tertiary amine, and when the thioalkanoic ingredient is the acid, per se, a third ingredient which is a metal base compound.

BACKGROUND OF INVENTION

The epihalohydrin elastomers are relatively recently developed specialty rubbers exhibiting when vulcanized excellent strength and elasticity, high oil resistance, excellent resistance to oxidation and attack by ozone, the highest known resistance to air or gas diffusion (homopolymer of epichlorohydrin) and both excellent physical properties and high oil resistance at low temperatures (copolymers of epichlorohydrin and an alkylene oxide). These elastomers have been vulcanized heretofore, see U.S.P. 3,026,-270 by polyamines, polyamine salts, polyamine carbamates, and metallic oxides which function by removing halogen from the elastomer chains and generate nitrogen-containing crosslinks. Sometimes, as is disclosed in U.S.P. 3,026,305 an alkyl thiuram disulfide, thiazole, dithiocarbamate or other conventional rubber accelerator-type compound is employed along with a polyamine. U.S.P. 3,341,491 and 3,414,529 show a mixture of respectively, a metal oxide such as red lead or diazabicyclo compound such as triethylene-diamine, and a mercaptoimidazoline compound in the vulcanization of epihalohydrin elastomers. Most, if not all, of these curing systems have drawbacks such as slow cures, high water extractability and swell, poor scorch characteristics, bleeding, and mold sticking and unacceptable mold corrosion. The application of these excellent elastomers has been somewhat retarded by reason of the shortcomings of available curing systems. Better curing systems for the epihalohydrin elastomers are badly needed.

SUMMARY OF INVENTION

The present invention relates to vulcanizable epihalohydrin elastomer compositions, an improved method of vulcanizing epihalohydrin elastomers, and vulcanized products of the latter method.

The method of this invention comprises mixing an epihalohydrin elastomer with a three-component vulcanization system comprising (1) a polythiol, as defined more fully below such as 3,6-dithiaoctane-1,8-dithiol, (2) a tertiary amine such as 1,4-diaza(2.2.2)bicyclooctane, and (3) a metal base compound such as sodium acrylate or litharge and then heating the resulting vulcanizable composition at a temperautre between about 300° and 390° F.

The vulcanization system of this invention offers excellent scorch protection, cure cycles which can range from as short as 3 to 5 minutes at 350° F. to as long as 50–60 minutes at 310° F. with no reversion producing vulcanizates exhibiting an excellent balance of physical properties including good tear strengths and abrasion resistance. Mold sticking usually is not encountered. Most of the gum stock and carbon black containing compositions exhibit good Viscurometer cure profiles, i.e. a sharp early rise in torque followed by a long-continued plateau. Neither type of composition shows reversion (declining Viscurometer cure on long-continued heating). The finished vulcanizates have only a mild odor.

SPECIFIC DESCRIPTION

Epihalohydrin elastomers

The elastomers employed in this invention are the rubbery, high molecular weight polymers of an epihalohydrin containing halogen atoms of atomic weight above 19, that is epichlorohydrin, epibromohydrin, and epiiodohydrin both in the homopolymeric and copolymeric forms. Such elastomers are prepared by polymerization of the epihalohydrin containing monomeric material in mass or in solution with organometallic catalysts such as the hydrocarbon aluminum or hydrocarbon zinc catalysts. These elastomers, especially the epihalohydrin homopolymers, can be produced in both amorphous and crystalline forms and also as a mixture of the amorphous and crystalline forms, depending mainly on the catalyst utilized. For use as an elastomer, the wholly amorphous and mixed forms low in crystallinity are much preferred. Copolymers of an epihalohydrin with an epoxide comonomer, for example a copolymer of epichlorohydrin with an alkylene oxide such as ethylene oxide, are nearly completely amorphous and highly rubbery in nature.

Polymerization of the epihalohydrin takes place through the epoxide groups so that the polymer has a polyether structure in which there are repeating halomethyl pendant groups thusly

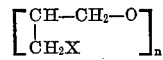

where X is a halogen of atomic weight greater than 19. In the same way, when the epihalohydrin is copolymerized with one or more other epoxides, including those which contain unsaturated carbon-to-carbon structures, polymerization with the indicated catalysts is believed to take place mainly through opening of the epoxide linkages.

Typical epoxide monomers which may be copolymerized with the epihalohydrin monomer to produce elastomeric copolymers useful in this invention are the already-mentioned alkylene oxides including ethylene oxide, propylene oxide, butene oxides, butadiene monoxide, cyclohexene oxide, vinyl cyclohexene oxide, epoxy ethers such as ethyl glycidyl ether, 2-chloroethyl glycidyl ether, allyl glycidyl ether, and others. In general, the copolymer may contain in combined form from about 10% to about 99%/wt. of the epihalohydrin and from about 90% to about 1% wt. of the epoxide comonomer. More preferred are the copolymers containing from about 1% to about 40%/wt. of an alkylene oxide in combined form with the remainder being combined epihalohydrin. Most preferred are the homopolymers of epichlorohydrin and copolymers as described of epichlorohydrin containing from about 1% to about 40%/wt. of combined ethylene oxide and the remainder combined epichlorohydrin.

The epihalohydrin elastomers to be elastomeric must be high in molecular weight. By this is meant a polymer evidencing a reduced solution viscosity ("RSV") of at least 0.2, more preferably 0.5 or more, as determined employing 0.1 gram of the polymer dissolved in 100 mole of alpha-chloronaphthalene as measured at a solution temperature of 100° C. In more practical terms, the epihalohydrin polymer to be elastomeric should be solid in nature evidencing a weight average molecular weight of at least 200,000 and a Mooney viscosity of at least about 25 ML (large rotor; after 4 minutes @ 212° F.).

Polythiol Ingredient

Monothiols are ineffective in the method of this invention.

Polythiols effective in this invention contain two or more mercapto-substituents per molecule, preferably as terminal —SH groups, and in any event all attached to a polyvalent organic radical (R) as represented by the formula $$(HS)_n R \qquad (1)$$

wherein R is a polyvalent organic connecting radical of valence at least 2 ($n \geq 2$; preferably 2 to 6). The polyvalent oragnic connecting radical R may vary quite widely including, for example, polyvalent aliphatic radicals such as an alkylidene group or any other polyvalent hydrocarbon group of aliphatic nature having at least two free valencies; polyvalent aromatic hydrocarbon radicals such as any of the isomeric phenylene groups, naphthalene groups, biphenyl groups, or any other polyvalent hydrocarbon groups of aromatic nature having at least two free valencies; and any similar polyvalent aliphatic or aromatic group having substituents thereon such as in a thialkylidene group, the styryl group, diphenyl oxide type groupings; ester groups; polyester groups, and many, many others. Many useful polythiols thus are polymercapto-substituted benzenes, polymercapto-substituted biphenyls, and polymercapto-substituted diphenyl oxides.

Preferred polythiols because of their activity in vulcanization are polymercapto-substituted compounds selected from the class consisting of (A) those of structure (1) wherein the polyvalent R group is a thialkylidene group (including a repeating thialkylidene group) thusly:

$$HS[(CH_2)_x—S]_y H \qquad (2)$$

wherein $x$ is a number indicating a number of carbon atoms which is from 2 to 20 and wherein $y$ is a number equal to or greater than 1, preferably from 2 to 6, an example of the latter type of compound being 3,6-dithiaoctane-1,8-dithiol ($x=2$; $y=3$), and (B) polymercaptocarboxylate compounds of structure (1) above containing at least two mercapto (—SH) groups per molecule and wherein R of structure (1) is a polyvalent polyester grouping which may be considered to have been derived from a polyhydric alcohol and a thioalkanoic acid, the latter compounds having structures (3) and (4) below:

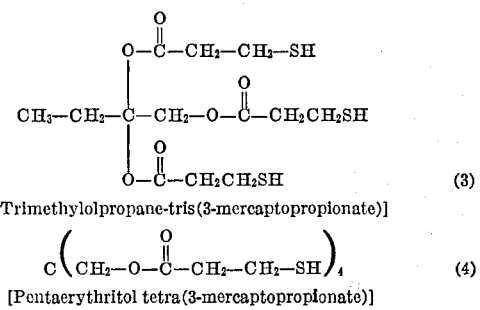

(3)

[Trimethylolpropane-tris(3-mercaptopropionate)]

(4)

[Pentaerythritol tetra(3-mercaptopropionate)]

Tertiary amine

Nearly any high boiling tertiary amine may be employed having the structure

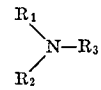

wherein $R_1$, $R_2$, and $R_3$ are the same or different and selected from the class of radicals consisting of monovalent alkyl, alkaryl, aryl, aralkyl and cyclic hydrocarbon radicals and such radicals containing additional tertiary amine groupings (as is present in N,N-dimethyl piperazine). By the term "high boiling" is meant an amine having low volatility at mixing and vulcanizing temperatures between about 200° and about 375° F. Tertiary amines found effective are N,N-diethylcyclohexylamine, N,N-dimethyl piperazine, and 1,4-diaza(2.2.2)bicyclooctane. Cure times and scorch times will vary according to the particular amine employed. However, by far the most active and most preferred is 1,4-diaza (2.2.2)bicyclooctane.

Metal base ingredient

Nearly any metal compound of basic or alkaline nature may be employed. Thus, there may be utilized monovalent metal carboxylates and carbonates, and particularly the alkali metal carboxylates such as sodium and potassium acetates, sodium and potassium propionates, sodium and potassium acrylates, sodium palmitate, sodium stearate, potassium oleate, sodium phthalate, sodium carbonate, etc. Also, polyvalent metal oxides, carboxylates and carbonates may be utilized such as litharge, red lead, zinc oxide, lead acetate, lead stearate, lead oleate, lead sebacate, magnesium benzoate, calcium benzoate, calcium carbonate and others. In addition, still other useful metal bases include the tin oxides, organotin oxides, germanium oxides, calcium carbonate, lead phosphites, and many others.

Preferred metal base compounds are selected from the class consisting of alkali metal carboxylates, lead oxides and lead carboxylates.

Particularly preferred metal bases are those selected from the class consisting of alkali metal acrylate such as sodium and potassium acrylates, the alkali metal propionates such as sodium and potassium propionates, lead oxides and lead carboxylates. Most preferred are lead compounds selected from the class consisting of lead oxide and lead carboxylates. Such lead compounds may form water-insoluble or sparingly-soluble halide salts and thereby may assist in producing vulcanizates which have lower sensitivity to water than those, for example, prepared employing monovalent metal bases such as sodium carboxylates. On the other hand, the alkali metal acrylates and propionates appear capable of inducing quite fast initial cure rates.

Proportions

The polythiol is employed in relatively small proportions, expressed in (—SH) equivalents which are calculated by multiplying the moles of curative by the number of (—SH) groups per molecule in the curative. The amount required ranges from about 0.010 equivalent to about 0.08 equivalent for every 100 parts by weight of elastomer. More preferred is from about 0.016 to about 0.06 equivalent per 100 parts by weight of elastomer.

The amine ingredient may be utilized in proportions ranging from about 0.5 to about 5 parts/wt. per 100 parts by weight of elastomer. More preferred proportions are from about 1 to about 3.5 parts by weight per 100 parts by weight of elastomer. In general, it is desirable to employ a minimum of the amine which will yield the desired rate of vulcanization in order to minimize the hydrophilicity of the vulcanizate.

The proportions of the metal base ingredient will vary somewhat more widely than the other ingredients due to differences in density and also perhaps due to differences in the efficiency of dispersion between, for example, inorganic metal oxides on the one hand as compared to the metal carboxylate salts on the other. Generally, at least about 2 parts by weight of any metal base ingredient are required and up to about 20 parts/wt. per 100 parts/wt. of elastomer, may be utilized. Better proportions are from 2 to about 12 parts/wt. per 100 parts/wt. of elastomer. With respect to the lead oxides such as litharge or red lead, it is better to employ between about 5 and about 15 parts by weight per 100 parts by weight of elastomer, although more may be utilized if desired.

Processing

The elastomer may be mixed with the curing ingredients of this invention at any temperature of about 250° F. or below without scorch. A better procedure is first to premix the elastomer with all of the compounding ingredients other than the curative ingredients at any temperature up to about 300° F. and with the vigorous mixing required to achieve best dispersion of the dry and powdery ingredients and then in a second step add the curatives at the above specified lower temperatures.

Vulcanization

The vulcanization system of this invention requires temperatures above about 250° F. for activation of cure. Cure rates are quite slow below about 300° F. so it is preferred to heat the composition, usually in a mold, at temperatures between about 300° and about 425° F. More preferred is from about 300 to about 390° F. In the latter range, vulcanization reaches optimum levels in from about 1 to about 45 minutes with wide variations the curvative levels.

Cure rate studies

For the purposes herein, the cure or vulcanization of the epihalohydrin elastomers according to the present invention is demonstrated in two different ways. One is the classical method wherein the elastomer is compounded, mixed, vulcanized and then subjected to the usual stress-strain type physical testing demonstrating the usual elastic behavior of well-vulcanized rubbers. More revealing of scorch times, cure rates, optimum vulcanization and overcure or reversion and the behavior of the stock during these phases is the use of the oscillating rotor Viscurometer (see U.S. Reissue Pat. 26,562 issued to J. R. Beatty and Paul W. Karper). In the examples to follow, there are reported the scorch time ($T_s$ or time for Viscurometer torque to increase 2-inch-lbs.) and $\Delta T$ or Viscurometer torque increase over the time interval.

In some cases, a $T_c$ value is presented, $T_c$ being the time in the Viscurometer to optimum cure. Optimum cure is by definition the time when 90% of maximum torque is developed in the Viscurometer. In these studies, the stock in the Viscurometer cavity is maintained at about 310°. The rotary deflection of the rotor in all cases is ±6°.

The invention will now be described more fully with respect to certain specific examples which are intended as being illustrative only and not as limiting the invention in any way.

EXAMPLE 1

In this example, various combinations of the vulcanization ingredients of this invention are mixed into a commercially-available epichlorohydrin homopolymer, "Hydrin 100" ("Hydrin," registered trademark of The B. F. Goodrich Company, Akron, Ohio; product marketed by B. F. Goodrich Chemical Company, Cleveland, Ohio). The mixing procedure is as described above under "Processing." The data below are Viscurometer data taken on the indicated simple mixtures each consisting of 92.5 parts/wt. of the elastomer and the indicated proportions of curing ingredients in parts/wt.:

| Composition | Viscurometer, 310° C. | | |
|---|---|---|---|
| | $T_s$, min. | $T_c$, min. | $\Delta T$ |
| A. "Hydrin 100," sodium acrylate, 3.25 | No cure | | |
| B. "Hydrin 100," DOD,[1] 4.0 | No cure | | |
| C. "Hydrin 100," amine,[2] 3.2 | 5.5 | 90 | 68.2 |
| D. "Hydrin 100," DOD,[1] 4.0, amine,[2] 3.2 | Negligible cure | | |
| E. "Hydrin 100," DOD,[1] 4.0, sodium acrylate, 1.9 | Negligible cure | | |
| F. "Hydrin 100," amine,[2] 3.2, sodium acrylate, 1.9 | 5.6 | 105 | 57.9 |
| G. "Hydrin 100," DOD,[1] 4.0, amine,[2] 3.2, sodium acrylate, 1.9 | 2.0 | 6.5 | 61.0 |

[1] DOD = 3,6-dithiaoctane-1,8-dithiol.
[2] 1,4 diaza(2.2.2)bicyclooctane.

The vulcanization secured in compositions C and F is due to the amine only, but such cure is extremely slow requiring 90 to 105 minutes at 310° F. to reach $T_c$.

In contrast, composition G shows a $T_s$ of only 2 minutes and an optimum cure time ($T_c$) of only 6.5 minutes. Thus all three ingredients form a system more than 10 times as fast as any other combination of the same three ingredients.

When the experiment G above is repeated substituting 12.4 parts/wt. of red lead for the sodium acrylate, a composition is obtained which shows Viscurometer values of $T_s = 1.7$ minutes; $T_c$ of 7.9 minutes; and $\Delta T$ of 78. This is a very fast curing combination of ingredients.

EXAMPLE 2

In this example, the vulcanization system of this invention is evaluated in more completely compounded compositions containing a reinforcing carbon black. Several polythiols are evaluated, both compositions containing red lead (oxide) as a metal base ingredient. As a control, a composiiton is included containing the mercaptoimidazoline/red lead system of U.S.P. 3,341,491. The compositions are evaluated first on the Viscurometer and second in the form of ASTM tensile sheets (vulcanized for the time indicated at 347° F.) by conventional (ASTM) stress-strain procedures.

| Composition, parts/wt. | Recipe number | | | | |
|---|---|---|---|---|---|
| | 1124 (control) | 1122A | 1123A | 1125A | 1125B |
| "Hydrin 100" | 160 | 221 | 221 | 221 | 221 |
| FEF carbon black | 80 | 110 | 110 | 110 | 110 |
| Waxy processing aid | | 2.20 | 2.20 | 2.20 | 2.20 |
| Amine [1] | | 3.08 | 3.08 | 2.32 | 2.32 |
| DOD [2] | | 7.57 | | 7.57 | 7.57 |
| Tetrathiol [3] | | | 8.64 | | |
| Red lead | 12.0 | 16.6 | 16.6 | 16.6 | 16.6 |
| Mag stearate | 1.6 | | | | |
| Azelaic acid | 6.4 | | | | |
| NBC [4] | 1.6 | | | | |
| Processing aid | 1.6 | | | | |
| NA-22 [5] | 2.4 | | | | |

[1] 1,4-diaza (2.2.2)bicyclooctane.
[2] DOD is 3,6-dithiaoctane-1,8-dithiol (for structure, see Formula 2 above).
[3] Tetrathiol (Formula 4 above) is pentaerythritol-tetra-(3-mercaptopropionate).
[4] NBC is nickel dibutyldithiocarbamate.
[5] NA-22, Du Pont, 2-mercaptoimidazoline.

| | Monsanto Rheometer data at 347° F. | | | | |
|---|---|---|---|---|---|
| $T_s$, sec | 50 | 0 | 10 | 17 | 17 |
| $T_c$ (minutes) | (¹) | 6 | (¹) | 6 | 6 |
| $\Delta T$ (in.-lb.) | ¹ 104 (30) | 117 | ¹ 75 (20) | 107 | 107 |

¹ Rheometer curve of torque vs. time does not reach a plateau but reaches a constant positive slope in time (min.) indicated in parentheses under $\Delta T$.

The Rheometer data show that all of the compositions are very fast curing with the fastest being the experimental compositions of this invention. The control demonstrates a weakness of the prior art mercaptoimidazoline/red lead curing system, namely, continued long term cure at elevated temperatures. The optimum cure rates shown by the experimental composition indicate they are fast enough for fabric coating applications.

The above compositions are subjected to conventional stress-strain testing wtih the results below.

|  | Stress-strain | | | | |
|---|---|---|---|---|---|
|  | 1124 (control) | 1122A | 1123A | 1125A | 1125B |
| Original properties: | | | | | |
| Cure time at 347° F., min | 30 | 6 | 20 | 6 | 21 |
| 100% modulus, p.s.i | 930 | 870 | 770 | 670 | 750 |
| 300% modulus, p.s.i |  |  |  | 2,500 | 2,650 |
| Ultimate tensile p.s.i | 2,060 | 2,840 | 2,400 | 2,630 | 2,650 |
| Elongation, percent | 290 | 290 | 230 | 350 | 300 |
| Hardness (Duro "A") | 74 | 71 | 72 | 68 | 70 |
| After air test tube aging, 70 hrs. at 150? C. | | | | | |
| Ultimate tensile, p.s.i | 2,370 | 2,310 | 2,070 | 2,390 | (¹) |
| Percent change, tensile | +13 | −19 | −14 | −9 | (¹) |
| 180° bend | Pass | Pass | Pass | Pass | (¹) |

¹ Not tested.

The original sress-strain data indicate a definite superiority in cure rates for the composition of this invention. Excellent physical properties are obtained in a fraction of the time required for the control.

Even though none of the experimental compositions contain antioxidants or stabilizers, note that they nevertheless show excellent properties after air test tube aging. The unstabilized experimental compositions showed only very minor reductions in tensile strength after air test tube aging for 70 hours at 150° C.

EXAMPLE 3

In this example, several polythiols are compared to several monothiols in a simple gum-stock (i.e. no carbon black or other filler) laboratory recipe as follows:

| Control recipe: | Parts/wt. |
|---|---|
| Hydrin 100 | 100 |
| Sodium acrylate | 1.9 |
| Amine ¹ | 3.2 |
| Thiol-DOD ² | 4.0 |

¹ 1,4-diaza(2.2.2)bicyclooctane.
² 3,6-dithiaoctane-1,8-dithiol.

The experimental compositions substitute the polythiol or monothiol indicated below for the "DOD" listed above in the Control Recipe.

| Thiols evaluated | Parts/wt. | Equivalents —SH |
|---|---|---|
| A. 3,6-dithiaoctane-1,8-dithiol (Formula 2 above) | 4.0 | 0.0374 |
| B. Trimethylolpropane-tris(3-mercaptopropionate) (Formula 3 above) | 4.97 | 0.0374 |
| C. Pentaerythritol-tetra-(3-mercaptopropionate) (Formula 4 above) | 4.56 | 0.0374 |
| D. Beta-mercaptoethyl stearate | 12.80 | 0.0374 |
| E. n-Octadecyl-beta-mercaptopropionate | 13.70 | 0.0374 |

|  | Control | | | | |
|---|---|---|---|---|---|
| Thiol composition number | (A) 1086-1 | (B) 1092-4 | (C) 1092-5 | (D) 1096-1 | (E) 1096-2 |
| $T_s$ (minutes) | 2.0 | 2.2 | 1.5 | (¹) | (¹) |
| $T_c$ | 6.5 | 7.6 | 7.0 | (¹) | (¹) |
| $\Delta T$ (in.-lb.) | 61 | 38 | 65.1 | (¹) | (¹) |

¹ No cure.

The above data clearly indicates that the vulcanization system of this invention requires a polythiol. Monothiols D and E produce no cure at all.

EXAMPLE 4

In this example, the level of the amine 1,4-diaza(2.2.2) bicyclooctane in the base recipe below is varied as indicated:

| Base recipe | |
|---|---|
| Material: | Parts/wt. |
| "Hydrin 100" | 92.5 |
| Sodium acrylate | 1.90 |
| DOD ¹ | 4.00 |
| Amine | 3.20, 1.60, 0.8 |

¹ Polythiol A, previous example.

The Viscurometer data at 310° F. are as follows:

|  | Viscurometer at 310° F. | | |
|---|---|---|---|
| Amine level, parts/wt. | $T_s$ | $T_c$ | $\Delta T$ |
| 3.20 | 2.0 | 6.5 | 61.1 |
| 1.60 | 2.0 | 9.8 | 64.0 |
| 0.80 | 3.6 | 18.7 | 66.0 |

The data above indicates that optimum cure time and scorch time can be varied by suitable variation in the proportion of amine.

EXAMPLE 5

In this example, sodium stearate is substituted for sodium acrylate in a moderately heavily-loaded carbon black recipe as follows:

| Material: | Parts/wt. |
|---|---|
| "Hydrin 100" | 100 |
| Sodium stearate | 6 |
| N550 carbon black | 50 |
| Processing aid | 1 |
| Amine | 1 |
| Polythiol (B) (see Ex. 3) | 3.5 |

The composition is vulcanized at 155° C. (ca. 310° F.) for about 8 minutes. The stress-strain values are as follows:

|  | Lbs./sq. in. |
|---|---|
| Tensile | 1900 |
| Percent elongation | 330 |
| 100% modulus | 670 |
| 300% modulus | 1870 |
| Hardness Duro "A" | 70 |

The above data indicate that sodium stearate is an effective metal base compound.

EXAMPLE 6

The procedure of Example 5 is repeated except for the substitution of an equal proportion of a commercially available epichlorohydrin/ethylene oxide copolymer elastomer known as "Hydrin 200" (T.M. B. F. Goodrich Chemical Company, Cleveland, Ohio). The stress-strain properties are:

|  | Lbs./sq. in. |
|---|---|
| Tensile | 1730 |
| Elongation | 360 |
| 100% modulus | 550 |
| 300% modulus | 1590 |
| Hardness-Duro "A" | 69 |

The vulcanization system including sodium stearate vulcanizes the copolymer elastomer quite well.

EXAMPLE 7

The procedures of the preceding examples are repeated employing both "Hydrin 100" and "Hydrin 200" elastomers and comparing the effects on vulcanization of red lead (oxide) vs. sodium acrylate as metal base compounds on the vulcanization of each elastomer. In all experiments a constant proportion of each of the amine [1,4-diaza-(2.2.2)bicyclooctane] and polythiol (B) (see Ex. 3) are employed.

| | Compositions—Parts/wt. | | | | | | | | | | | |
|---|---|---|---|---|---|---|---|---|---|---|---|---|
| | 1A | 1B | 1C | 2A | 2B | 2C | 3A | 3B | 3C | 4A | 4B | 4C |
| Material: | | | | | | | | | | | | |
| "Hydrin 100" | 100 | 100 | 100 | 100 | 100 | 100 | | | | | | |
| "Hydrin 200" | | | | | | | 100 | 100 | 100 | 100 | 100 | 100 |
| Red lead (oxide) | 7.5 | 7.5 | 7.5 | | | | 7.5 | 7.5 | 7.5 | | | |
| Sodium acrylate | | | | 2 | 2 | 2 | | | | 2.0 | 2.0 | 2.0 |
| N550 carbon black | 50 | 50 | 50 | 50 | 50 | 50 | 50 | 50 | 50 | 50 | 50 | 50 |
| Processing aid | 1.0 | 1.0 | 1.0 | 1.0 | 1.0 | 1.0 | | | | | | |
| Do | | | | | | | 1.0 | 1.0 | 1.0 | 1.0 | 1.0 | 1.0 |
| Amine (see above) | 1.0 | 1.0 | 1.0 | 1.0 | 1.0 | 1.0 | 1.0 | 1.0 | 1.0 | 1.0 | 1.0 | 1.0 |
| Polythiol (see above) | 3.5 | 3.5 | 3.5 | 3.5 | 3.5 | 3.5 | 3.5 | 3.5 | 3.5 | 3.5 | 3.5 | 3.5 |
| | Original stress-strain | | | | | | | | | | | |
| Cure time (min.) | 45 | 45 | 40 | 20 | 5 | 3 | 45 | 35 | 30 | 25 | 5 | 3 |
| Temp. (° F.) | 290 | 310 | 350 | 290 | 310 | 350 | 290 | 310 | 350 | 290 | 310 | 350 |
| 100% modulus (p.s.i.) | 670 | 1,350 | 1,920 | 1,340 | 1,030 | 1,200 | 400 | 550 | 750 | 1,080 | 830 | 1,030 |
| 300% modulus (p.s.i.) | 2,630 | | | | | | 1,520 | 2,060 | | | | |
| Tensile (p.s.i.) | 2,630 | 2,870 | 2,970 | 2,390 | 2,330 | 2,510 | 2,130 | 2,500 | 2,450 | 2,300 | 2,300 | 2,330 |
| Elongation (percent) | 300 | 240 | 160 | 210 | 250 | 220 | 460 | 390 | 280 | 210 | 280 | 220 |
| Duro "A" | 69 | 75 | 75 | 73 | 72 | 70 | 67 | 69 | 69 | 71 | 69 | 69 |
| Ultimate tensile (p.s.i.) | 3,170 | 3,230 | 3,050 | 2,820 | 2,750 | 2,950 | 2,590 | 2,400 | 2,500 | 2,220 | 2,380 | 1,960 |
| Tensile, percent change | +20.5 | +12.5 | +2.7 | +18 | +18 | +17.5 | +21.6 | −4 | +2 | −3.5 | +3.5 | −16 |
| Duro "A" | 75 | 79 | 77 | 73 | 77 | 75 | 73 | 72 | 71 | 74 | 72 | 72 |
| Hard. chg. (pts) | +6 | +4 | +2 | 0 | +5 | +5 | +6 | +3 | +2 | +3 | +3 | +3 |
| 180° bend | | | | | | All passed | | | | | | |

The above data show that the cure system of this invention can provide vulcanizates from both epihalohydrin homopolymer and copolymer elastomers having excellent properties over a broad range of cure conditions.

I claim:
1. A vulcanizable elastomeric composition comprising (a) a rubbery, high molecular weight polymer of an epihalohydrin having polyether structure in which there are repeating units of the structure

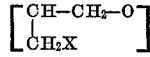

wherein X is a halogen atom of atomic weight greater than 19, (b) a polythiol compound of the formula $(HS)_nR$ wherein R is a polyvalent organic connecting radical and $n$ is a number representing the valence of R and equal to at least 2, said polythiol being employed in proportions as to yield from about 0.01 to about 0.08 equivalent of (—SH) for every 100 parts/wt. of rubbery ingredient (a) in said composition, (c) a high boiling tertiary amine having low volatility at temperatures between about 200° and about 375° F. and having the structure

wherein $R_1$, $R_2$ and $R_3$ are the same or different and are selected from the class of radicals consisting of monovalent alkyl, alkaryl, aryl, aralkyl, cyclic hydrocarbon, and such radicals containing additional tertiary amine groupings, said ingredient (c) being employed in proportions from about 0.5 to about 5 parts/wt., for every 100 parts/wt. of said ingredient (a) in said composition, and (d) a metal base compound selected from the class consisting of monovalent metal carboxylates, moonvalent metal carbonates, and polyvalent metal oxides, carboxylates and carbonates, said metal base compound (d) being employed in proportions ranging from at least 2 parts/wt. up to about 20 parts/wt. for every 100 parts/wt. of rubbery ingredient (a) in said composition.

2. A vulcanizable composition as defined in claim 1 and further characterized by the said tertiary amine ingredient (b) being 1,4-diaza(2.2.2)bicyclooctane.

3. A vulcanizable composition as defined in claim 1 and further characterized by said polythiol ingredient (b) being a compound wherein the polyvalent connecting radical R is a thialkylidene group and by said tertiary amine ingredent (c) being 1,4-diaza(2.2.2)bicyclooctane.

4. A vulcanizable composition as defined in claim 1 and further characterized by said polythiol ingredient (b) being a compound wherein the polyvalent connecting radical R is a polyvalent polyester grouping derived from a polyhydric alcohol and a thioalkanoic acid and by said tertiary amine ingredient (c) being 1,4-diaza(2.2.2)bicyclooctane.

5. A vulcanizable elastomeric composition comprising (a) a rubbery, high molecular weight polymer of epichlorohydrin having a polyether structure in which there are repeating units of the structure

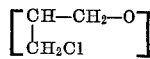

(b) a polythiol compound of the formula $(HS)_n R$ wherein R is a polyvalent organic connecting radical and $n$ is a number representing the valence of R and equal to at least 2, said polythiol ingredient being present in said composition in proportions as to yield from about 0.016 to about 0.06 equivalent of (—SH) for every 100 parts by weight rubbery ingredient (a), (c) from about 1 to about 3.5 parts by weight of 1,4-diaza(2.2.2)bicyclooctane for every 100 parts/wt. of rubbery ingredient (a), and (d) from at least 2 parts/wt. up to about 20 parts/wt. of a metal base compound, for every 100 parts/wt. of rubbery ingredient (a), selected from the class consisting of moonvalent metal carboxylates, monovalent metal carobnates, and polyvalent metal oxides, carboxylates, and carbonates.

6. A vulcanizable composition as defined in claim 5 and further characterized by the said rubbery ingredient (a) being a homopolymer of epichlorohydrin, by said polythiol ingredient (b) being 3,6-dithiaoctane-1,8-dithiol, by said tertiary amine ingredient being 1,4-diaza(2.2.2)bicyclooctane, and by said metal base compound (d) being a lead oxide.

7. A vulcanizable composition as defined in claim 5 and further characterized by said rubbery ingredient (a) being a copolymer containing from about 60% to about 99% by weight of combined epichlorohydrin and about 1% to about 40% by weight of combined alkylene oxide, by said polythiol ingredient (b) being trimethylolpropane-tris-(3-mercaptopropionate), and by said metal base ingredient (d) being a lead oxide.

8. A vulcanizable composition as defined in claim 5 and further characterized by said rubbery ingredient (a) being a homopolymer of epichlorohydrin, by said polythiol ingredient (b) being pentaerythritol-tetra-(3-mercaptopropionate), by said tertiary amine ingredient (c) being 1,4-diaza(2.2.2)bicyclooctane, and by said metal base ingredient (d) being an alkali metal carboxylate.

9. A vulcanizable composition as defined in claim 5 and further characterized by said rubbery ingredient (a) being a copolymer containing from about 60% to about 99% by weight of combined epichlorohydrin and from about 1% to about 40% by weight of combined ethylene oxide, by said polythiol ingredient (b) being 3,6-dithiaoctane-1,8-dithio, and by said metal base ingredient (d) being an alkali metal carboxylate.

10. A method of vulcanizing a rubbery, high molecular weight polymer of an epihalohydrin having a polyether structure in which there are repeating units of the structure

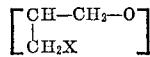

wherein X is a halogen atom of atomic weight greater than 19 comprising mixing the said rubbery polymer with a three-component vulcanization system comprising (1) a polythiol compound of the formula $(HS)_nR$ wherein R is a polyvalent organic connecting radical and $n$ is a number representing the valence of R and equal to at least 2, said ingredient (1) being employed in proportions as to yield from about 0.01 to about 0.08 equivalent of (—SH) for every 100 parts by weight of said rubbery polymer, (2) a high boiling tertiary amine having low volatility at temperatures between about 200° and about 375° F. and having the structure

wherein $R_1$, $R_2$ and $R_3$ are the same or different and are selected from the class of radicals consisting of monovalent alkyl, alkaryl, aryl, aralkyl, cyclic hydrocarbon, and such radicals containing additional tertiary amine groupings, said ingredient (2) being employed in proportions from about 0.5 to about 5 parts/wt. for every 100 parts/wt. of said rubbery polymer, and (3) from about 2 up to about 20 parts/wt. for every 100 parts/wt. of said rubbery polymer of a metal base compound selected from the class consisting of monovalent metal carbonates, and polyvalent metal oxides, carboxylates and carbonates, and heating the resulting mixture at a temperature in the range of from about 300° to about 425° F.

11. A method of vulcanizing a rubbery, high molecular weight polymer of epichlorohydrin having a polyether structure in which there are repeating units of the structure

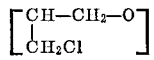

comprising mixing said rubbery polymer with a three-component vulcanization system consisting of (1) a polythiol compound of the formula $(HS)_nR$ wherein R is a polyvalent organic connecting radical and $n$ is a number representing the valence of R and equal at least to 2, said polythiol ingredient (1) being employed in proportions as to yield from about 0.016 to about 0.06 equivalent of (—SH) for every 100 parts by weight of said rubbery polymer, (2) from about 1 to about 3.5 parts by weight of 1,4-diazo(2.2.2)bicyclooctane for every 100 parts/wt. of said rubbery polymer, and (3) from about 2 to about 12 parts/wt. per 100 parts/wt. of said rubbery polymer of a metal base compound selected from the class consisting of monovalent metal carboxylates, monovalent metal carbonates, and polyvalent metal oxides, carboxylates and carbonates, and heating the resulting mixture at a temperature in the range of from about 300° to about 390° F.

12. A method as defined in claim 11 and further characterized by said rubbery polymer in a homopolymer of epichlorohydrin and by said polythiol ingredient (1) being a compound in which the polyvalent connecting radical R is a polyvalent polyester grouping derived from a polyhydric alcohol and a thioalkanoic acid.

13. A method as defined in claim 11 and further characterized by said rubbery polymer being a homopolymer of epichlorohydrin, by said polythiol ingredient (1) being 3,6-dithioactane-1,8 dithiol, and by said metal base ingredient (3) being a lead oxide.

14. A method as defined in claim 11 and further characterized by said rubbery polymer being a copolymer containing between about 60% and about 99% by weight of combined epichlorohydrin and from about 1% to about 40% by weight of a combined alkylene oxide, by said polythiol ingredient (1) being trimethylolpropane-tris-(3-mercaptopropionate), and by said metal base ingredient (3) being an alkali metal carboxylate.

15. The method as defined in claim 11 and further characterized by said rubbery polymer being a homopolymer of epichlorohydrin, by said polythiol ingredient (1) being pentaerythritol-tetra-(3-mercaptopropionate), and by said metal base ingredient (3) being a lead oxide.

16. The method as defined in claim 11 and further characterized by said rubbery polymer being a copolymer containing from about 60% to about 99% by weight of combined epichlorohydrin and from about 1% to about 40% by weight of combined ethylene oxide, by said polythiol ingredient (1) being trimethylolpropane-tris-(3-mercaptopropionate), and by said metal base ingredient (3) being sodium acrylate.

References Cited

UNITED STATES PATENTS

| | | | |
|---|---|---|---|
| 3,297,635 | 1/1967 | Bergman et al. | 260—47 |
| 3,310,527 | 3/1967 | De Acetis et al. | 260—47 |
| 3,448,112 | 6/1969 | De Acetis et al. | 260—294.8 |
| 3,341,491 | 9/1967 | Robinson et al. | 260—45.75 |
| 3,414,529 | 12/1968 | Green et al. | 260—2 |

DONALD E. CZAJA, Primary Examiner

M. I. MARQUIS, Assistant Examiner

U.S. Cl. X.R.

260—2 A, 18 EP, 37 EP